March 20, 1962  J E. KOSTUR  3,025,566
AUTOMATIC VACUUM FORMING MACHINE FOR PLASTICS
Filed Feb. 6, 1959  2 Sheets-Sheet 1
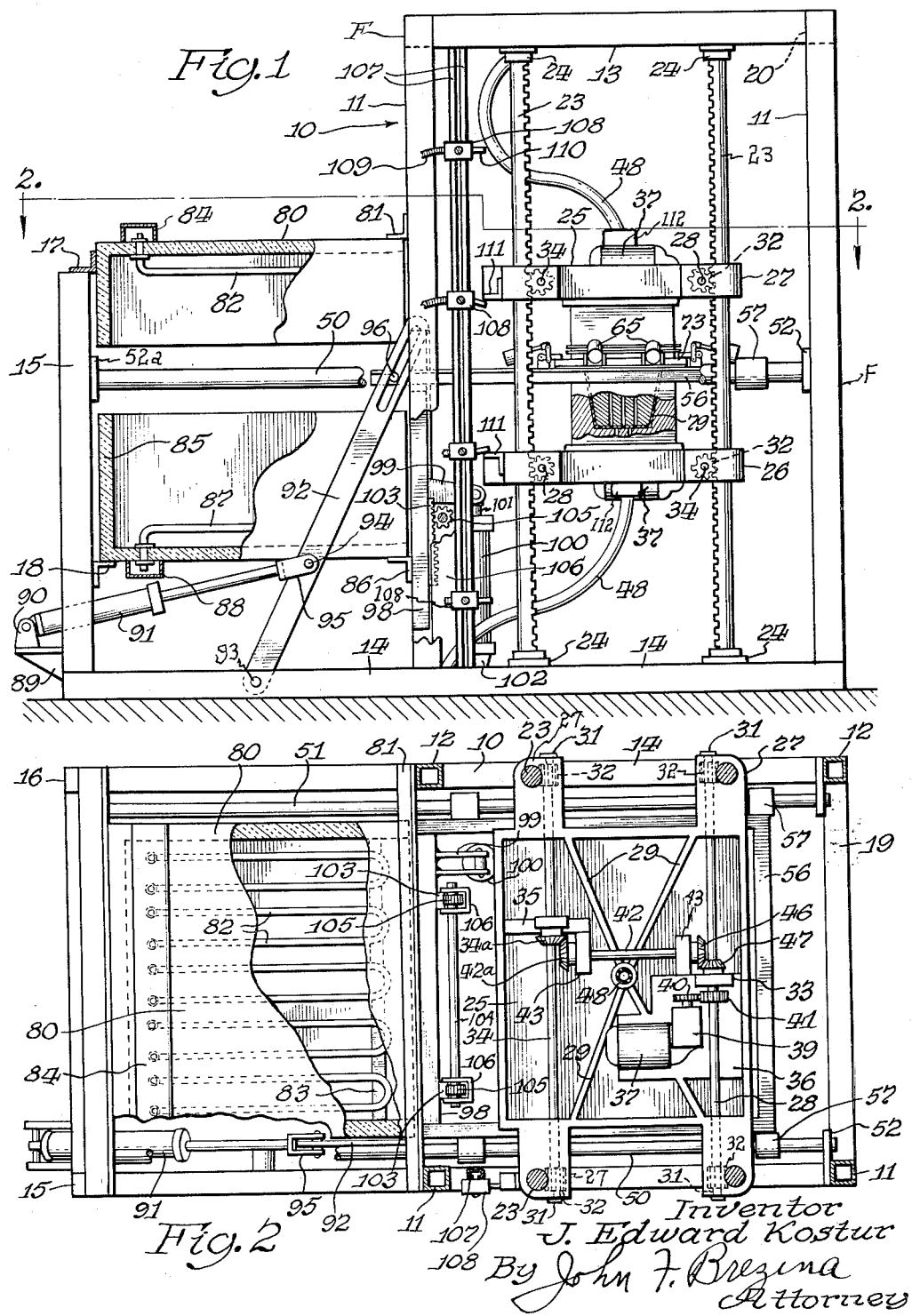

Inventor
J. Edward Kostur
By John F. Brezina
Attorney

United States Patent Office 3,025,566
Patented Mar. 20, 1962

3,025,566
AUTOMATIC VACUUM FORMING MACHINE
FOR PLASTICS
J Edward Kostur, 330 Timber Trail S., Elmhurst, Ill.
Filed Feb. 6, 1959, Ser. No. 791,616
11 Claims. (Cl. 18—19)

Previous machines for vacuum molding plastics have employed vertically moving platens which have been movably actuated by air-operated plungers or air hydraulic cylinders and movable pistons connected to such platens. One objectionable feature of such machines is the fact that the elongated air cylinders have to be mounted both above and below the movable platens and the cylinders have to project substantially above and substantially below the machine and above and below the area of movement of the platens, with the result that in larger machines there is insufficient space below the machine and above it for such air cylinders. This is especially true where the platens necessarily have to have a relatively long stroke and relatively long range of movement which is required in so-called deep-draw work. The mounting of long air cylinders with pistons above and below the movable platens makes it necessary to build the machine objectionably high and big so that a great amount of space is occupied and cost is greatly increased.

Another objectionable feature of existing machines utilizing air plungers and air cylinders and piston means for moving the platens is that when the platen engages portions of the heated plastic to expand or draw the same the resistance of the plastic material causes a slowing down and hesitation of the movement of the platen. In other words, a non-uniform speed of movement results which is very undesirable in that it produces relatively weak areas in the plastic unit due to non-uniform drawing and non-uniform expansion thereof and in addition slows the production.

A further objectionable feature of such machines having the platens movable by air cylinder and piston means above and below the platens is that the range of stroke of the pistons is limited within the machines of given size due to necessity for the air cylinder and piston means being within the area of the machine and within a given limited space.

In presently known machines having air cylinder and piston power means for moving the platens adjustment and control of stoppage of movement is very difficult and it is very difficult to vary the distance of stroke and of movement of the platens to the varying requirements. Another objectionable feature is that with such present machines proper alignment and parallel positions of the platens cannot be assured, and is not uniformly attained, with the objectionable result of uneven non-uniform drawing, stretching and forming of the heated plastic sheets.

It is an object and accomplishment of my new invention to produce a machine having vertical movement guided platen in which the power unit or prime mover comprises an electric brake and gear motor mounted on the platens themselves, which motors are operatively connected by gear reducers and gear means to a plurality of mounted vertical rack bars along the sides of the machine; and which include means for controlling said prime movers to produce uniform aligned vertical movement of the platens at uniform and accelerated speeds and which will not yield or hesitate in movement due to resistance produced by the plastic material being prepared and drawn.

Further advantages and accomplishments of my invention is the provision of such machines having electrically energized drives or power means for moving the platens which provide a greater range of stroke of the platens; which permit the entire machine to be made substantially lower and smaller, occupy less space and cost less to build; and which produces a smooth and uniform speed of movement of the platens in contrast with jerky and erratic movements produced by air plungers.

A further advantage thereof is that correct alignment and parallel travel of the platens is assured and less labor time is required to adjust and position mechanical stops and electrical limit switches which limit the strokes of the platens to meet the requirement of particular jobs which require varying distances of movement.

A further advantage of my machines is in the provision of a pair of stationary opposed upper and lower heating ovens having a plurality of thermostatically controlled heating elements therein; and guiding and track means for selectively moving opposed clamping frames which hold the plastic sheet between said ovens, and having means for horizontally quickly and easily moving the clamping frames with the heated plastic into the working position between opposed cooperating slidably mounted platens.

On the drawings:

FIG. 1 is a side elevational view illustrating the side portions of my novel vacuum forming machine, having certain parts broken away and illustrated in cross section.

FIG. 2 is a top plan view thereof looking from above and taken substantially on line 2—2 of FIG. 1.

Figure 3:
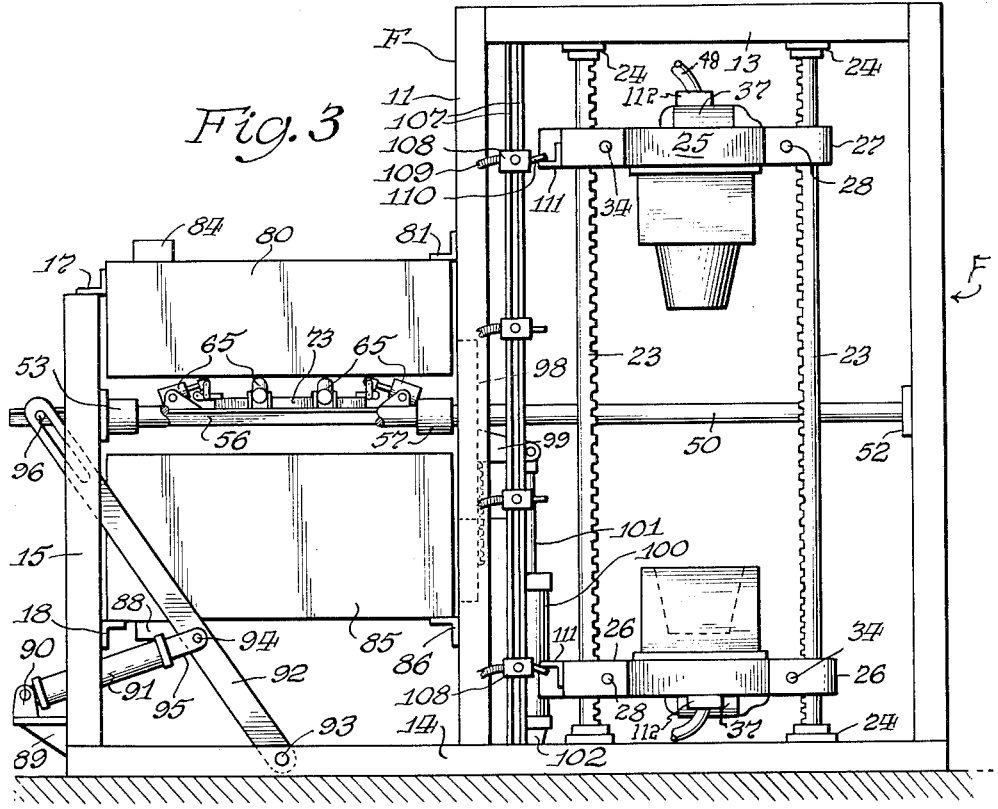
FIG. 3 is a side elevation of my machine, with the movable platens widely separated and near their uppermost and lowermost positions respectively.

Numeral 10 generally designates a rectangular metal frame F having vertical parallel side bars or standards 11 and 12 which are connected by upper and lower horizontal bars 13 and 14, said connections at their junctures being preferably by welding.

The lower horizontal base bars 14 extend rearwardly and are connected to the lower ends of two vertical rear corner bars 15 and 16 which are shorter than the vertical corner bars 11 and 12. The two rear vertical corner bars 15 and 16 are connected by upper and lower horizontal angular bars 17 and 18 which are secured by welding, as illustrated at the left in FIG. 1. Said vertical corner bars 11 and 12 are preferably of the hollow type of rectangular or square cross section, as illustrated in FIG. 2.

The two front vertical standards 11 and 12 are connected at their lower ends by a front cross bar 19 and at their upper ends by a front cross bar 20. The upper cross bar 20 and lower cross bar 19, together with the two front standards provide a rectangular front frame.

Figure 4:
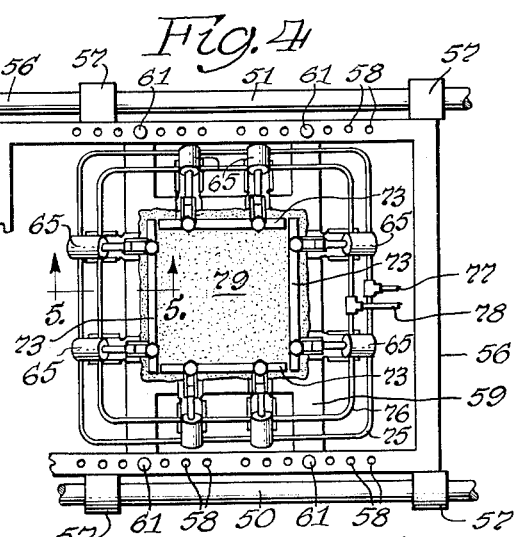
FIG. 4 is a top view looking from above and downwardly at the movable carriage and plastic mounting and holding frame and adjacent parts in the front portion of the machine.

Two gear rack bars 23 are mounted vertically in spaced relation between the lower side bar 14 and upper side bar 13 and by means of suitable flanges at the ends therof. There are two of said gear rack bars on each side, only two thereof being illustrated in FIG. 1. The positions of all four of rack bars 23 are also illustrated in FIG. 2. Said rack bars 23 are mounted with the rows of teeth extending inwardly of the frame. Said teeth may optionally extend transversely either rearwardly or forwardly. The opposite ends of said rack bars are mounted in apertured flanged fittings or bushings 24 which are suitably secured to the side bars of the frame by screws (not shown), as illustrated in FIG. 4, and in the upper part of FIG. 1. Said rack bars 23 are vertical and parallel and provide a guide and mounting means for vertical movement of the movable platens hereinafter described.

In FIG. 2 is illustrated a plan view of the upper platen 25 which is movably mounted with respect to the four rack bars 23. The lower platen 26 is of identical construction except it is in inverted position with its power means secured on its under side. Said platen 25 which is preferably of aluminum or aluminum alloy, comprises a substantially rectangular plate having four hollow and passaged extended housings 27 integral therewith and two thereof projecting horizontally from one end thereof and two thereof projecting horizontally from the opposite end thereof. Said platen plate 25 is flanged and thicker at its periphery, as indicated in FIGS. 1 and 2, and it has a pair of diagonally extending integral reinforcing webs or ribs 29, as illustrated in FIG. 2.

The upper and lower extended housings 27 are aligned so that they will slide on the rack bars respectively. Said housings 27 on each platen have horizontally aligned bearing passages therethrough. Journalled in one pair of aligned passages of two of the housings 27 is a horizontal shaft 28 whose ends are also journalled in apertured end caps 31 respectively, as shown in FIG. 2. Each of said housings 27 has a vertical passage therein through which passages said vertical rack bars 23 extend. Said platens 25 and 26 are mounted on said rack bars 23 before said rack bars are mounted in position in the frame.

Two gear pinions 32 are mounted on the opposite ends of the shaft 28, as shown in FIG. 2, and these are in mesh with the teeth of the two forward rack bars 23. A journalling block 33, secured by screws to the platen, journals the intermediate part of said shaft 28, as shown in FIG. 2.

A sesond horizontal shaft 34, shown at middle of FIG. 2, and similar to shaft 28, is journalled in the aligned apertures of the other two oppositely extending housings 27, shown at the middle part of FIG. 2, and in an intermediate journalling block 35 which is secured by screws (not shown) to the platen. Two pinions 32 are secured on opposite ends of the shaft 34 and these mesh with the teeth of the other two rack bars 23, respectively.

Numeral 36 designates a flat base plate secured to the upper face of the platen and 37 designates a geared head brake electric motor secured to said base plate 36 by screws (not shown). The geared head brake motor 37 is connected to an electric supply source by wires (not shown) which pass through a suitable control switch (not shown), which is mounted on the front portion of the machine. Said electric motor 37 is of a type having a built-in brake, which brake will stop the rotation and hold the motor in stopped poistion when the circuit to the motor is opened.

Motor 37 is operatively connected to a speed reducer 39 on whose shaft is a gear 40. A gear 41 mounted on shaft 28 is in mesh with gear 40 and driven thereby to transmit rotation to shaft 28. A transverse horizontal shaft 42 is journalled in two spaced bearing blocks 43 which are secured on the platen, as shown in FIG. 2. One end of shaft 42 has a beveled gear 46 secured thereon which meshes with a beveled gear 47 secured on the intermediate part of shaft 28. A beveled gear 42a is secured on the other end of shaft 42 and meshes with a beveled gear 34a secured on the intermediate part of shaft 34.

Accordingly, said motor is operatively connected to drive the two shafts 28 and 34 and their respective pinions 32 in the same direction at one time. Rotation of said shafts 28 and 34 and said pinions 32 will move the upper platen uniformly and evenly either upwardly or downwardly, according to the direction of the rotation of the motor.

The lower platen 26 is constructed similarly to the upper platen 25, and it has an electric motor and shaft and gear mechanism mounted on its lower face in the same manner as the motor, shaft and gear mechanism which has been described as being mounted on the upper face of the upper platen 25. The lower platen 26 accordingly has two similar selectively driven horizontal shafts 28 and 34 which drive four pinion gears 32 which in turn mesh with the gear teeth of the four vertical rack bars 23, respectively. Said lower platen and its motor is independently controlled through a separate control switch (not shown) so that said lower platen may be independently and selectively moved either upwardly or downwardly to desired position.

Each of said platens 25 and 26 has a central hole to each of which is connected a three-way valve 112. To said valves are connected one end of separate air hoses 48 respectively and which hoses extend to a suitable air pump (not shown). Air is pulled through said hose and valves to produce a vacuum, or to introduce compressed air into the molding area. Only fragments of said two hoses 48 are illustrated in FIGS. 1 and 4. Said hoses 48 provide means for selectively producing a partial vacuum in the cavities of dies which are mounted on the platens and also provide means for moving the formed plastic units from their compressed positions. When said three-way valves are in a certain position, compressed air is adapted to be blown into mold area to help form the softened plastic into the desired shape.

Suitable valves (not shown) are provided for controlling the production of partial vacuum in said hoses and consequently in the cavities of dies on one or both of said platens.

It is to be understood that operation of the control means of said motors will operate said motors and its mechanisms in opposite direction or in the same direction so that said platens may selectively be moved toward each other or simultaneously separated.

*Description of Slidable Clamping Frame and Its Guide Means*

As illustrated in FIGS. 1 to 4, two horizontal track and guide rods 50 and 51 are mounted about midway between the uppermost bars and lowermost bars. Track rod 50 has its opposite ends mounted by screws in a mounting plate 52 on front standard 11 and in a sleeve bushing 53 on rear vertical bar 15, as shown in FIG. 3, and its intermediate portion passes through a slotted bracket (not shown). Track rod 51, shown at right of FIG. 2, has its ends similarly secured by bolts in a mounting plate 52 (see FIG. 2) and in a bushing 52a. Said securance of said last mentioned track rod 51 is slidable to a limited degree, due to permissive transverse movement of the mounting plate and bushing as the screws or bolts which mount the same pass through slots (not shown), to compensate for the spreading action caused by heat expansion of the slidable frame hereinafter described.

As shown in FIG. 4, a metal outer apertured clamping frame or carriage 56 of rectangular form is composed of four bars joined at their corners by welding or the like. Said outer frame 56 is slidably mounted with respect to the two horizontal track rods 50 and 51 by means of four passaged and recessed bearing knuckles 57 whose bearing passages are horizontal and aligned and are slidable on the two track rods 50 and 51, respectively, as shown in FIG. 4. This provides for controlled horizontal movement of the clamping frame 56 between positions between the ovens at the rear of the machine and positions between the platens in the forward part of the machine. The movable carriage or frame 56 has four groups of apertures 58 formed in its side members, as illustrated in FIG. 4, to provide for adjustably positioning an inner clamp carrying frame hereinafter described.

An inner substantially rectangular frame 59 of varying sizes having integral end extensions 60 is adjustably secured to outer frame 56 by means of bolts 61, as shown in FIG. 4 which pass through certain of the apertures 58. Said inner frame 59 provides a means for mounting a plurality of air-activated clamping devices thereon such as illustrated in FIGS. 5 and 6.

A plurality of air operated clamping devices are secured on the peripheral portion of the inner frame 59 which will now be described. Referring to FIGS. 5 and 6 numeral 62 designates a metal base which has two apertured integral side wings 63. Numeral 64 designates a central apertured angular bracket which is secured by screws 72 to base 62. Numeral 65 designates an air cylinder having a piston and a piston rod 66. The passaged outer end of piston rod 66 is connected by two metal links 67 by means of a rivet to the intermediate portion of bracket 64. One end of a pair of spaced apart arms 68 (only one of which is shown) are pivotally secured by a rivet to the upper end of bracket 64 as shown. The intermediate part of arms 68 are connected by a rivet-held metal link 69 to the upper rivet which passes through the end of the piston rod and through the upper ends of links 67. Air cylinder 65 has air inlet and outlet ports 70 and 71 at opposite ends thereof.

Figure 6:
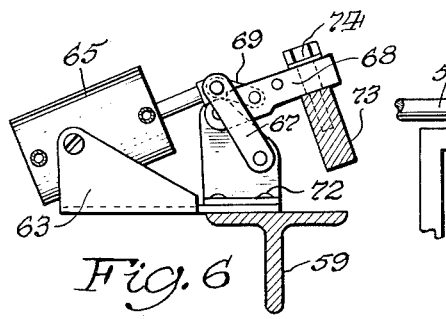
FIG. 6 is an enlarged elevation of one of said clamps showing it in its partially open position.
Figure 5:
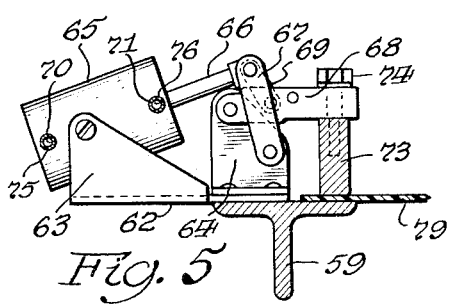
FIG. 5 is an enlarged partially cross sectional view of one of the gripping clamps and taken on a plane indicated by line 5—5 of FIG. 4, and showing the clamp in closed position.

Numeral 72 designates screws which pass through holes in the base 62 and brackets 64 and through holes in inner frame 59 to thereby mount the clamping device with respect to said inner frame, as illustrated in FIGS. 4, 5 and 6.

As shown in FIGS. 4, 5 and 6, a square shaped metal clamping frame 73 composed of four individual sections, is releasably and adjustably connected to the outer portions of clamping arms 68 by means of a plurality of releasable bolts 74 which extend between each pair of adjacent arms 68 and into threaded passages respectively formed in the said clamping frame 73. Said clamping frame is composed of four separate bars as illustrated in FIG. 4.

As illustrated in FIG. 4, numerals 75 and 76 designate two inner and outer air pipes which have suitable pipe fittings whereby outer pipe 75 is communicatively connected at spaced apart points to each of the air cylinders 65 at the rear end portions thereof. Inner air pipe 76 is communicatively connected to the forward ends of the respective air cylinders 65 by suitable fittings, only fragments of which are illustrated in FIG. 5. Said air pipes 75 and 76 are connected by pipes to a valve (not shown) and in turn to a compressed air supply source (not shown), fragments of which said pipes are designated as 77 and 78 at the right of FIG. 4.

As shown in FIG. 4 numeral 79 designates a sheet of plastic material to be formed, a fragment thereof being shown also in FIG. 5.

When the respective clamps are open, as illustrated in FIG. 6, the plastic sheet 79 is inserted with its peripheral portions between lower clamping frame 59 and the sections of metal clamping frame 73. Such upraised open inposition of the sections of clamp 73 is attained by introducing compressed air into inner pipe 76 and retracting the pistons in the cylinders. As this is done, the pressure of air in pipe 75 is released. After positioning of the plastic sheet, the operator will close a switch to operate a valve to introduce compressed air into pipe 75 and into the cylinders 65 to project the pistons and piston rods 66 to cause the described levers and links to move the bars comprising the metal clamping frame 73 down against the edge areas of the plastic sheet to firmly clamp it in the manner illustrated.

As illustrated in FIGS. 1, 2 and 3, numeral 80 designates an upper oven in the form of an inverted insulated hood, which is secured to two intermediate standards 11 and 12 by means of a right angled bar 81 with the aid of screws (not shown). At its rear portion, said oven 80 is secured by screws (not shown) to the angular cross bar 17. A plurality of U-shaped electrical heating members 82, having angularly bent terminal ends are secured in suitably spaced apart holes in the upper wall of oven 80, as shown in the upper left of FIGS. 1 and 2. The doubled back looped ends of said electrical heating elements are mounted on a transverse supporting cross bar 83, a portion of which is illustrated in FIG. 2. The angularly extending upper terminal ends of said heating elements are connected by wires in a conventional manner to an electrical supply source with a suitable control switch (not shown) being interposed in the wires. A channel 84 is removably mounted over the upper terminal ends of heating elements 82, as shown in FIG. 1.

A lower oven 85 opening upwardly and of non-conductive material is mounted below the rear portion of track rods 50 and 51, as illustrated in FIGS. 1 and 3, and the same is mounted on lower rear cross bar 18 and on a second angular cross bar 86. Said oven 85 has mounted therein a plurality of U-shaped heating elements 87 whose angularly bent ends are mounted in spaced apart holes in the bottom of oven 85 and which are connected by wires (not shown) to a control switch and an electric supply source (not shown).

A channel-like protecting shield 88 is secured over the projecting terminal ends of heating elements 87, as shown in FIG. 1.

As shown in the middle part of FIGS. 1 and 2, and partially in dotted lines in FIG. 3, I provide a vertically slidable door 98 which is slidable along the front end portions of the ovens and adapted to selectively close the forward opening between said ovens. Said panel-like door 98 has a pair of projecting bracket arms 99. An air cylinder 100 is mounted vertically on a bracket 102, as shown in FIGS. 1 and 3, and a slidable piston 101 has its upper end connected by a pin to the two arms 99. Air cylinder 100 is communicatively connected to a valve (not shown) and to a compressed air source to provide for selective raising and lowering of said oven door 98. Said door 98 is opened by lowering the same before the carriage is moved rearwardly to position between the ovens, and said door is closed by raising it by operation of said air cylinder and piston after the carriage has been positioned between the ovens in order to provide for raising the heat to the desired degree between said ovens. When the plastic has been subjected to the desired amount of heat the air cylinder 100 is operated to lower the door 98 to permit retracting movement of the carriage.

In order to provide for proper and even vertical movement of said door 98 and avoid binding thereof, I provide two toothed rack bars 103 in spaced apart relation and secured on said door. A transverse shaft 104 having two gears 105 is journalled in aligned holes in two spaced apart channel like brackets 106, said brackets being secured at their lower ends with respect to the frame. Gears 105 mesh with rack bars 103 respectively and guide the vertical movements of door 98 and avoid binding thereof.

The frame or carriage 56, which carries the inner clamping frame and clamping devices described, is slidable on the two track rods 50 and 51 to and from positions between said ovens 80 and 85. I provide power means for selectively moving said carriage and attached parts into positions between said ovens and back to positions between the movable platens. As shown in FIGS. 1 and 3 a shelf 89 is secured on the rear face of the rear standard 15, which in turn carries a bracket 90. An air cylinder 91 is pivoted at one end to bracket 90. A lever 92 is pivoted at 93 to the base bar 14 and its intermediate portion is pivoted by a pivot 94 to the projecting end of a piston rod 95. The upper portion of lever 92 is slotted as shown. The rear end portion of carriage 56 carries a transversely extending stud 96 which extends through the slot of lever 92. Air cylinder 91 is connected at both ends to a compressed air source (not shown) and to a suitable valve (not shown) whereby introduction of compressed air into the front part of cylinder 71 will retract the piston 95 and lever 92 to move the carriage from a forward position between the platens to rearmost position between the ovens. During such rear position for the desired time, the plastic sheet gripped by the clamp will be heated to the desired degree, and then the air valve will introduce compressed air into the rear part of the cylinder 91 to move the piston 95 and lever 92 forward to thereby move the carriage and the clamping frame and ring and heated plastic carried thereby to a position between the platens 25 and 26 and above or below the dies which are mounted on one or both of said platens.

I also provide highly advantageous means for controlling the strokes or distances of vertical movements of the two platens. This means comprises a plurality of manually adjustable stopping or limit switches which are adjustably mounted in vertically spaced relation relative to the path of movements of said platens.

Said means comprises a pair of vertical mounting rods 107, as shown in FIGS. 1 and 3, and which are secured a short distance apart and with their opposite ends suitably secured in the upper cross bar 13 and in the lower cross bar 14 respectively, and so that the same are parallel to the rack bars 23.

Slidably mounted for vertical adjustment of a pair of bars 107 are a plurality of electrical stop switches or limit switches 108, each of which are connected by electrical wire cables to the upper electric motor and the lower electric motor, the fragments of said electric cables 109 being shown in FIGS. 1 and 3. Each of said limit switches 108 has an operating and control arm 110 thereon and projecting a short distance into the vertical path of movement of the said two platens 25 and 26. As indicated in FIGS. 1 and 3, the projecting housing of the upper platen 25 has an angular bracket 111 thereon, and the projecting housing of the lower platen 26 has a similar projecting bracket 111 secured thereon by screws or the like. The transversely extending portion of the bracket 111 on the upper platen 25 is in a position so that it will engage the upper operating arm 110 of upper switch 108, to thereby open said upper switch and thereby stop operation of the upper motor 37, to thereby immediately stop upward vertical movement of the upper platen 25.

When said upper platen 25 is moved downwardly, the bracket 111, will engage and open the second and lower switch 108 to thereby stop descent of the upper platen 25. It is to be understood that said stop switches 108 are adjustably clamped on the two rods 107 so that their respective positions may be adjusted, according to the length of stroke of the platen as desired and to correspond with the requirement of a particular die and its operation.

The bracket 111 of the lower platen 26 is adapted to actuate the arm 110 of the second from the lower switch 108 to thereby open the support to the electric motor on the lower platen, and thereby stop upward movement of the said lower platen 26 and of any die carried thereon. The lowermost stop switch 108 is adapted to be similarly actuated and opened by the bracket 111 of the lower platen 26 to similarly limit the downward descent of the lower platen, the range of movement of said lower platen being thereby adjustable and regulatable.

I will now describe the normal cycle of operation of my novel vacuum molding machine. The lower platen 26 is in lower position, and the upper platen in upper position, as illustrated in FIG. 3. In most instances only one cavity die is suitably mounted on the lower platen with its interior cavity communicating with an air-withdrawal hose, as illustrated. In some instances a second die, such as illustrated in the upper portion of FIG. 3, is suitably secured on the under face of the upper platen 25, as illustrated in FIG. 3.

The carriage 56 and the parts carried thereby are positioned in the forward position substantially between the said platens. With the clamping devices such as illustrated in FIGS. 5 and 6 in open position, a plastic sheet 79 is mounted in position between the movable frame 73 and the frame 59. Thereupon, the operator presses a button which actuates a solenoid valve to admit compressed air into the respective cylinders 65 to cause a movement of the clamping levers to cause a downward movement of the clamping frame 73 and consequent clamping of the plastic sheet in a substantially flat horizontal plane. Thereupon, an electrical impulse will actuate a solenoid valve (not shown) to introduce compressed air into the forward part of cylinder 91 to thereby retract and move rearwardly lever 92 to in turn move the slidable carriage 56 and clamping frame and plastic sheet 111 into a position between the two ovens, such as illustrated in FIG. 3.

Thereupon, an electrical impulse will actuate another solenoid valve (not shown) to introduce compressed air into cylinder 103 to cause an elevation and closing of the oven door 98, which said closing of said door aids in more quickly raising the temperature in the area between said ovens. The heating elements 82 of said ovens are thermostatically controlled to maintain the desired temperature. The plastic sheet is allowed to remain between said ovens for a predetermined time, as selected, until the same will be properly pliable and stretchable.

After the desired interval of heating of the plastic sheet, an electrical impulse will operate the solenoid valve to open the oven door 98 and operate the solenoid valve (not shown) to introduce compressed air into cylinder 91, to cause forward movement of lever 92 and forward movement of the carriage 56 along the two track rails 50 and 51, to thereby move the plastic sheet to a position over a cavity die mounted on the lower platen.

The operator will then cause the platens to close or move toward each other and in contact with the plastic sheet. The operator will then actuate a switch to operate a vacuum pump (not shown) to withdraw a part of the air from the cavity of the die to thereby draw certain portions of the softened plastic sheet into the cavity of the die.

In some instances, the upper platen is caused to move downwardly by operation of a hand electric switch controlling the motor of the upper platen to thereby cause portions of the depending die on the lower face of the upper platen to engage and press against certain parts of the softened plastic sheet which have been already deformed in the other part of the mold partially by air pressure caused by the partial vacuum within the lower cavity die.

After a short interval sufficient to partially rigidify the plastic in its newly formed shape, the operator will operated two electrical switches (not shown) to cause a separation of the two platens and their respective dies, whereupon the formed plastic article, together with its projecting edges or skirt, are manually removed from the clamping frame. In some instances compressed air is blown through the die to loosen and remove the article from the die. Thereafter, surplus undesired edge parts or skirt portions of the plastic surrounding the article formed are removed by cutting the same away.

My novel machine described in the foregoing provides an automatic machine for quickly and satisfactorily performing vacuum forming, pressure forming and mechanically forming of softened thermo-plastic sheets into various shapes and into articles and products of a wide variety of shapes. The vacuum forming and pressure forming may be performed simultaneously as hereinbefore described, or optionally the pressure forming may be performed immediately after the vacuum forming of the softened thermo-plastic sheet and during the same cycle of operation.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a vacuum forming machine, a frame; upper and lower vertically spaced apart heat ovens; electrical heating elements in said ovens; a pair of horizontally extending track rods mounted on the sides of said frame; a carriage slidably mounted on said track rods; a clamping frame carried by said carriage, and adapted to releasably hold plastic sheets, said carriage and said clamping frame being movable along said track rods into positions between said ovens; a plurality of vertically extending parallel rack bars secured to the side members of said frame; an upper platen slidably mounted on said rack bars; a lower platen slidably mounted on said rack bars; an electric motor mounted on each of said platens; gear and shaft mechanism operably connected to each of said motors and including pinions engaging said rack bars whereby motor actuated movements of said gear and shaft mechanisms will move said platens upwardly and downwardly respectively; and controlled compressed air-operated mechanism for selectively moving said carriage and said plastic holding frame from and into positions between said platens and from and into positions between said ovens.

2. In a vacuum moulding machine of the described class; a frame having vertically extending connected together corner-bars; a plurality of ovens spaced apart vertically and connected to said rearmost corner bars; a pair of parallel rearwardly extending track rods extending horizontally along the sides of said machine respectively and connected at their opposite ends to said vertical corner bars; a substantially rectangular clamping frame; a plurality of aligned knuckles on said clamping frame, said knuckles being slidably mounted for horizontal movement on said track rods, said clamping frame having a plurality of air-operated arms thereon; a metal ring secured on said arms; being adapted to releasably hold plastic sheets; a plurality of vertical extending parallel rack bars in said frame; an upper platen slidably mounted on said rack bars; a lower platen slidably mounted on said rack bars; an electric motor mounted on each of said platens; gear and shaft mechanism operably connected to each of said motors and including pinions engaging said rack bars whereby motor actuated movement of said gear and shaft mechanisms will selectively move said platens vertically; controlled air-operated mechanism operably pivotally connected to said frame and to said clamping frame for selectively moving said clamping frame and said ring to and from positions between said platens and to and from positions between said ovens; and controlled switch means for selectively operating said motors and for selectively reciprocating said clamping frame along said track rods to selectively position said clamping frame between said ovens and to selectively position said frame between said platens.

3. In a vacuum molding machine, a frame having a plurality of vertical standards at and between the corners thereof and having a base and a plurality of transverse bars connecting said standards; a pair of parallel rearwardly extending track rods extending horizontally along the side standards of said machine respectively; a carriage having its outer portion slidably mounted on said track rods; a clamping frame mounted on said carriage; a plurality of releasable air-actuated clamps mounted on said clamping frame, said clamping frame being adapted to releasably hold plastic sheets; a pair of vertically spaced apart ovens mounted in the rear portion of said machine above and below the rear portion of said track rods respectively; a plurality of vertically extending parallel rack bars in said frame; an upper platen having passages adjacent its periphery and being slidably mounted on said rack bars; a lower platen having passages therein adjacent its periphery and slidably mounted on said rack bars; said platens being slidably mounted on said rack bars and in parallel positions; an electric motor mounted on each of said platens; gear and shaft mechanism operatively connected to each of said motors and including pinions engaging said rack bars whereby motor actuated movement of said gear and shaft mechanisms will selectively move said platens vertically; said platens being adapted to carry cooperating dies respectively; controlled air-operated mechanism operably pivotally connected to said frame and to said clamping frame for selectively moving said clamping frame and said carriage to and from positions between said platens and to and from positions between said ovens; and controlled switch means for selectively operating said motors and for selectively reciprocating said clamping frame along said track rods to selectively position said clamping frame between said ovens and to selectively position said frame between said platens.

4. In a machine for vacuum moulding plastic sheets; a frame; a pair of horizontally extending guide tracks along sides of said machine; a plurality of heating elements connected to said frame and below the rear end portions of said guide tracks; a plurality of heating elements connected to said frame above the rear end portions of said guide tracks; a clamping frame slidably mounted on said guide tracks, and adapted to be moved between the upper and lower heating elements; a plurality of releasable clamping devices on said clamping frame adapted to releasably hold plastic sheets; air-operated piston and piston rod means for operating said clamping devices; a plurality of parallel vertically extending rack bars mounted in the forward portion of said machine; an upper platen slidably mounted on said rack bars; a lower platen slidably mounted on said rack bars; an electric motor mounted on each of said platens; gear and shaft mechanism operably connected to each of said motors and connected to said platens, and including driven pinions engaging said rack bars respectively; and controlled switch means connected in circuit with said motors respectively and adapted to selectively operate said motors to thereby selectively move said platens toward and away from each other, said platens being adapted to support forming dies adapted to engage a plastic sheet held in said clamping frame.

5. A machine for vacuum forming plastic sheets substantially as described in claim 4, and having an air-operated mechanism operably connected to said clamping frame; and having a control switch means for selectively operating said air-operated mechanism to thereby selectively move said clamping frame and plastic sheets carried thereby to different positions along said guide tracks.

6. In combination with the machine for vacuum forming plastic sheets having a frame and having a plurality of upper and lower heating elements connected to said frame, and a plurality of track rods along the sides of said frame to positions adjacent said heating elements, a clamping frame slidably mounted on said track rods; air-actuated releasable clamping devices on said clamping frame for holding plastic sheets; a plurality of vertically extending spaced apart parallel rack bars mounted in the forward portion of said machine; and upper horizontally extending platen slidably mounted on said rack bars; a lower horizontally extending platen slidably mounted on said rack bars; an electric motor mounted on the upper face of said upper platen; an electric motor mounted on the lower face of said lower platen; cooperating pinion, gear and shaft mechanism operably connecting said motors respectively and said rack bars whereby operation of said motors will move said platens vertically along said rack bars; a control means for selectively operating said motors in either direction; and a control mechanism for selectively moving said clamping frame into and out of positions between said platens and into and out of positions between said upper and lower heating elements.

7. In a vacuum forming machine, a frame including vertical corner bars; a pair of parallel horizontal track rods secured to said corner bars and along the sides of said frame; heating elements connected to said frame and above and below the rear portions of said track rods; a horizontally extending carriage slidable on said track rods, a plastic sheet holding frame on said carriage; a plurality of vertical and parallel rack bars secured at their opposite ends to the upper and lower portions of said frame; a pair of horizontally extending platens movable vertically and slidably engaging said rack bars; said platens being adapted to support molding forms thereon; an electric motor mounted on the upper side of said upper platen; an electric motor mounted on the lower side of said lower platen; gear and shaft mechanisms mounted on said platens and operatively connected to each of said motors and including pinions engaging said rack bars; and controlled switch means for selectively operating said motors said platens whereby said platens may be selectively moved to cause engagement of molding forms on said platens with plastic sheets in said holding frame said carriage and said sheet-holding frame being selectively movable to positions between said heating elements and between said platens.

8. A vacuum forming machine substantially as recited in claim 1 and wherein a plurality of air-actuable clamping devices are mounted to move said clamping frame to selectively clamp plastic sheets under said clamping frame; and having a plurality of adjustably positioned stop switches connected in circuit with said electric motors and mounted in vertically spaced positions to be operated by vertical movements of said platens to thereby limit the distances of movements of said platens.

9. A vacuum forming machine as recited in claim 1 and having a slidable door for closing the opening between said ovens, and having air actuated mechanism for selectively opening and closing said door.

10. In a plastic moulding machine of the described class; a frame; a plurality of ovens mounted in said frame and spaced apart vertically; a pair of parallel track rods mounted on said frame and extending horizontally along the sides of said machine respectively; a movable carriage slidably mounted on said track rods; a clamping movable ring; a plurality of air-actuable clamping devices mounted on said carriage and adapted to move said clamping ring, said ring being adapted to hold plastic sheets on said carriage; actuable mechanism for selectively operating said clamping devices; a plurality of spaced apart vertical rack bars in said frame; an upper platen slidable on said rack bars; a lower platen slidable on said rack bars; an electric motor on said upper platen; an electric motor on the lower side of said lower platen; gear and shaft mechanism connected to said platens and operably connected to each of said motors and including pinions engaging said rack bars; controlled mechanism operably connected to said carriage for selectively moving said carriage and said clamping frame to and from positions between said platens and to and from positions between said ovens; switch means for selectively operating said motors and for reciprocating said carriage; and stop switches electrically connected to said motors to adjustably limit the distance of movement of said platens.

11. A vacuum forming machine substantially as recited in claim 7 and wherein said carriage carries a movable clamping frame adapted to releasably grip plastic sheets, and wherein said clamping devices include a movable ring and a plurality of air-operated mechanical clamps for selectively moving said ring; each of said clamps including an air cylinder and piston, and a plurality of levers connecting each of said pistons and said clamping ring to selectively move said clamping ring relative to said carriage.

References Cited in the file of this patent

UNITED STATES PATENTS

| | | |
|---|---|---|
| 1,234,330 | Gray | July 24, 1917 |
| 1,880,873 | Derry | Oct. 4, 1932 |
| 2,700,179 | Benson | Jan. 25, 1955 |
| 2,847,706 | Hawkins | Aug. 19, 1958 |